(12) United States Patent
Kasahara

(10) Patent No.: US 9,544,098 B2
(45) Date of Patent: Jan. 10, 2017

(54) INFORMATION PROCESSING APPARATUS, CONTROL METHOD FOR THE SAME AND STORAGE MEDIUM

(71) Applicant: CANON KABUSHIKI KAISHA, Tokyo (JP)

(72) Inventor: Kimito Kasahara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 14/543,249

(22) Filed: Nov. 17, 2014

(65) Prior Publication Data
US 2015/0143193 A1    May 21, 2015

(30) Foreign Application Priority Data
Nov. 19, 2013    (JP) .................... 2013-238769

(51) Int. Cl.
*H04L 1/18*    (2006.01)
*H04L 1/08*    (2006.01)

(52) U.S. Cl.
CPC ...................................... *H04L 1/08* (2013.01)

(58) Field of Classification Search
CPC .................................................. H04L 1/1809
USPC .................................. 714/748, 733, 11, 4.4
See application file for complete search history.

(56) References Cited

U.S. PATENT DOCUMENTS

| | | | | |
|---|---|---|---|---|
| 4,813,001 A | * | 3/1989 | Sloane | G01R 27/28 702/110 |
| 5,473,771 A | * | 12/1995 | Burd | G06F 11/1443 709/248 |
| 2006/0111106 A1 | * | 5/2006 | Moon | H04W 36/38 455/435.2 |
| 2011/0299117 A1 | * | 12/2011 | Hashimoto | G06F 1/3203 358/1.15 |

FOREIGN PATENT DOCUMENTS

JP    2007-174247 A    7/2007

* cited by examiner

*Primary Examiner* — Fritz Alphonse
(74) *Attorney, Agent, or Firm* — Rossi, Kimms & McDowell LLP

(57) ABSTRACT

An information processing apparatus, connected to a management server managing a set value used among a plurality of information processing apparatuses, can perform an appropriate process according to the situation of an information processing system and can prevent wasteful power consumption thereof. A set value acquired from the management server and changed by the information processing apparatus is transmitted to the management server, but when the transmission fails, the transmission of the changed set value is retried, and it is switched according to a classification of the set value to be transmitted whether the retry is stopped or is continued.

9 Claims, 10 Drawing Sheets

*FIG. 4A* *FIG. 4B*
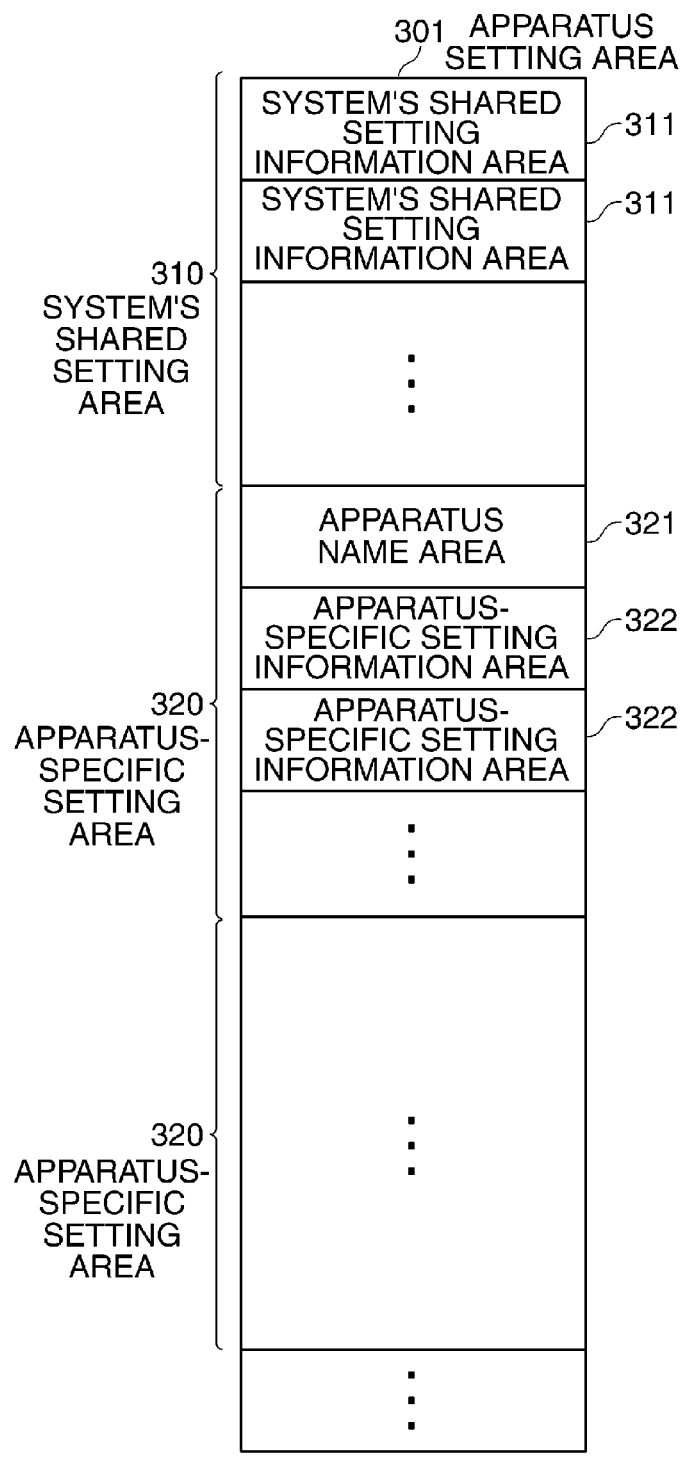
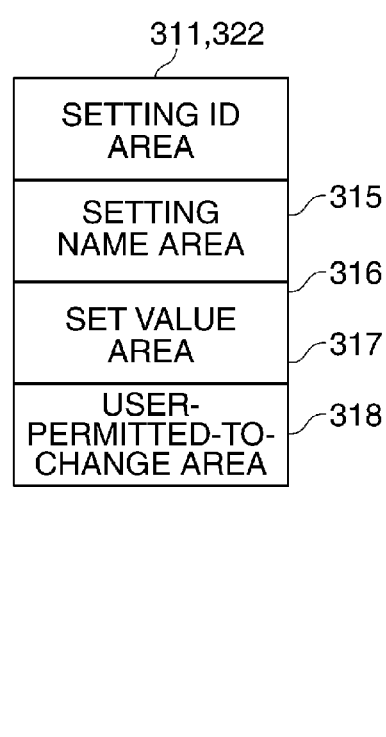

INFORMATION PROCESSING APPARATUS, CONTROL METHOD FOR THE SAME AND STORAGE MEDIUM

BACKGROUND OF THE INVENTION

Field of the Invention

The present invention relates to an information processing apparatus, a control method therefor and a storage medium, and more particularly, to a control technique for sharing and synchronizing set values among a plurality of information processing apparatuses.

Description of the Related Art

Conventionally, there has been an information processing system in which a set value management server is arranged to manage set values in order that the set values are shared among a plurality of information processing apparatuses, and the set values are reflected by performing communication between each information processing apparatus and the set value management server. In this configuration, when a set value is changed in any of the information processing apparatuses, the apparatus transmits the content of the change to the set value management server. Accepting the content of the change, the set value management server transmits change information to the other information processing apparatuses. Thereby, the setting is reflected on all the apparatuses.

In such an information processing apparatus as described above, when communication with the set value management server is performed in synchronization with a set value changing operation by a user of an information processing apparatus in the case where the speed of communication between the information processing apparatus and the set value management server is low or the communication is unstable, responsiveness is bad, and the user's operability is reduced. Therefore, the information processing apparatus is required to transmit the contents of change to the set value management server independently from the timing of the set value changing operation by the user.

If the communication between the information processing apparatus and the set value management server fails, the information processing apparatus is required to retry communication because the user of the information processing apparatus cannot be necessarily notified that the communication has failed. For example, it is disclosed that, when communication between a data transmitting apparatus and a receiving apparatus fails, the process is switched according to the factor in the failure in the communication (see Japanese Laid-Open Patent Publication (Kokai) No. 2007-174247).

However, if retry is continued when the communication between the information processing apparatus and the set value management server fails, power consumption of the information processing apparatus increases. For example, even if the information processing apparatus is provided with a power-saving mode, the information processing apparatus cannot shift to power-saving while retry is continued. In such a case, when only the conventional technique is used, only the factor in communication failure can be considered, and, therefore, only the same retry process can be performed while the communication failure factor is the same.

SUMMARY OF THE INVENTION

The present invention has been made in view of the above problem, and the present invention provides a technique making it possible to perform an appropriate process according to the situation of an information processing system and capable of preventing wasteful power consumption of an information processing apparatus.

In a first aspect of the claimed invention, there is provided an information processing apparatus connected to a management server managing a set value used among a plurality of information processing apparatuses, the information processing apparatus comprising an acquisition unit configured to acquire a set value from the management server, a changing unit configured to change the acquired set value, a transmission unit configured to transmit the set value changed by the changing unit to the management server, and a retry unit configured to retry transmission of the changed set value when the transmission by the transmission unit fails, wherein the retry unit switches between stopping the retry temporarily and continuing the retry according to a classification of the set value to be transmitted from the transmission unit.

According to the present invention, since it is possible to change a communication retry method according to the classification of data to be communicated between an information processing apparatus and a set value management server, it is possible to perform an appropriate process according to the situation of an information processing system and prevent wasteful power consumption of the information processing apparatus.

Further features of the present invention will become apparent from the following description of exemplary embodiments (with reference to the attached drawings).

BRIEF DESCRIPTION OF THE DRAWINGS

FIG. 4A is a schematic diagram of data storage areas in an apparatus setting area in FIG. 3, and FIG. 4B is a schematic diagram of data storage areas in an system's shared setting information area and an apparatus-specific setting information area in FIG. 4A.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Figure 1:
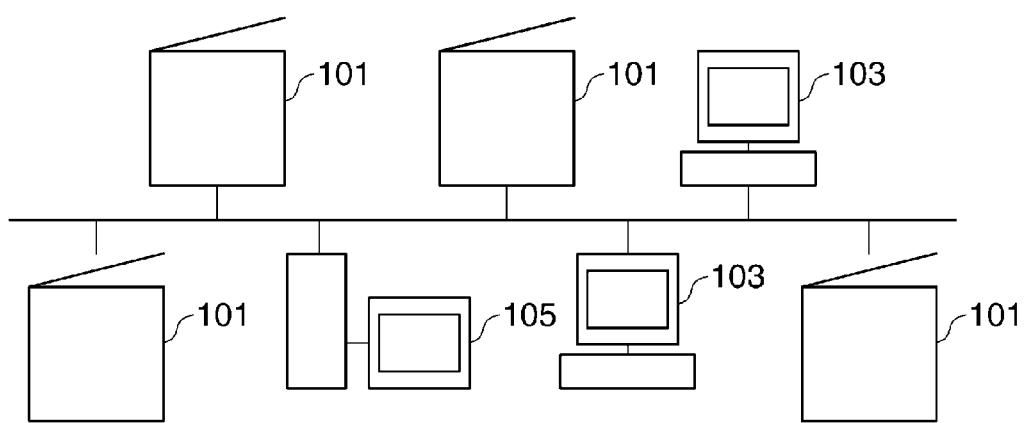
FIG. 1 is a network diagram showing an example an information processing system in which information processing apparatuses according to a first embodiment of the present invention is installed.

FIG. 1 is a network diagram showing an example an information processing system in which information processing apparatuses according to a first embodiment of the present invention is installed.

In FIG. 1, the information processing system is configured with a plurality of information processing apparatuses 101, a plurality of information processing terminals 103 and one management server 105, which are connected with each other via a network.

For example, the information processing apparatus 101 can receive a request for printing image data from the information processing terminal 103 to print an image or can read an image from an original sheet to print the read image. The information processing apparatus 101 can also convert an image read by a scanner section 402 (see FIG. 2A) to be described later, to a JPEG format or the like, to transmit it to the information processing terminal 103 using a protocol such as SMB. Furthermore, the information processing apparatus 101 can receive a set value to be used therein from the management server 105 to use it as a setting for a process to be performed therein. Here, it is assumed that the information processing apparatus 101 can be logged in and used so that the set value can be customized individually for each user thereof.

Figure 2A:
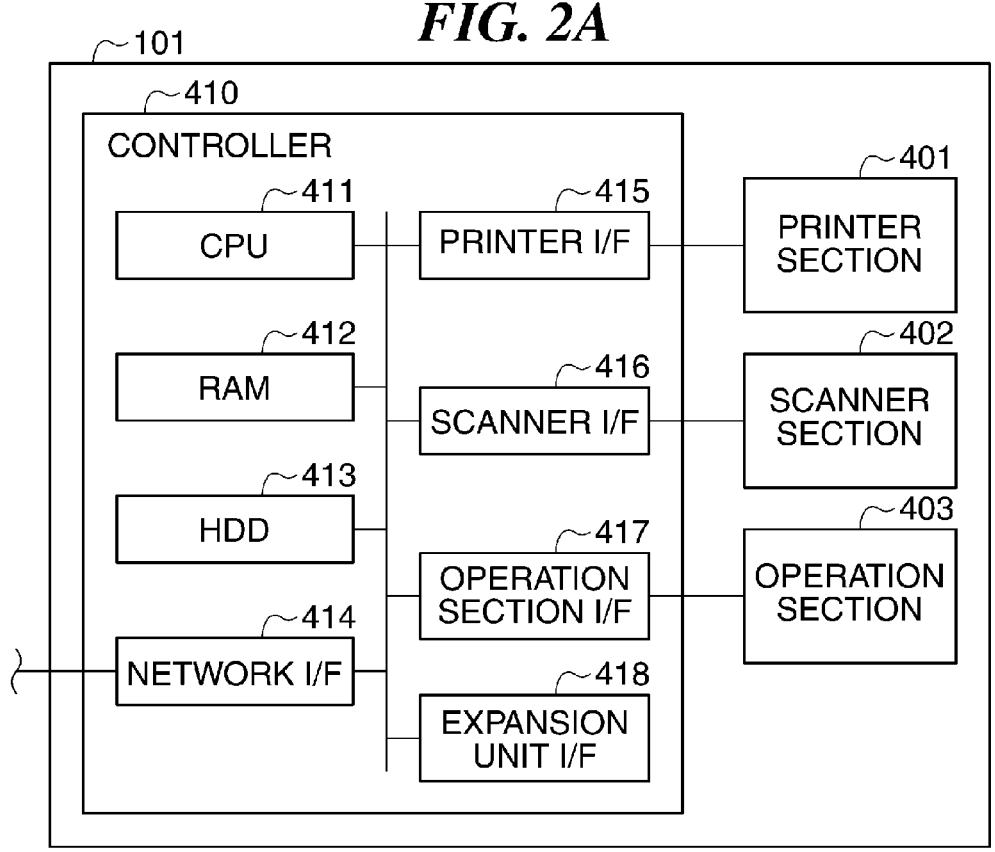
FIG. 2A is a block diagram showing a schematic configuration of hardware of the information processing apparatus in FIG. 1.

FIG. 2A is a block diagram showing a schematic configuration of hardware of the information processing apparatus 101 in FIG. 1.

The information processing apparatus 101 is provided with a controller 410, a printer section 401, a scanner section 402, and an operation section 403.

The controller 410 is provided with a CPU 411, a RAM 412, an HDD 413, a network I/F 414, a printer I/F 415, a scanner I/F 416, an operation section I/F 417 and an expansion unit I/F 418.

The CPU 411 can give and receive data and the like to and from the RAM 412, the HDD 413, the network I/F 414, the printer I/F 415, the scanner I/F 416 and the operation section I/F 417. The CPU 411 also develops an instruction read out from the HDD 413 on the RAM 412 and executes the instruction stored in the RAM 412.

In the HDD 413, instructions which can be executed by the CPU 411, a consumption degree transmitted to the management server 105, set values to be used in the apparatus, and the like can be stored.

The RAM 412 is a memory where the instructions stored in the HDD 413 are developed so as to be read out by the CPU 411, and various kinds of data required for execution of the instructions can be stored.

The network I/F 414 is an interface for performing network communication with the management server 105, the information processing terminals 103 and the like in the information processing system in FIG. 1. The network I/F 414 notifies the CPU 411 that data has been received or transmits data on the RAM 412 to the network.

The printer I/F 415 is an interface which transmits image data transmitted from the CPU 411, to the printer section 401, and transmits state information about the printer section 401 received from the printer section 401, to the CPU 411.

The scanner I/F 416 is an interface which transmits an image read instruction transmitted from the CPU 411, to the scanner section 402 and transmits image data received from the scanner section 402, to the CPU 411. The scanner I/F 416 is also capable of transmitting state information about the scanner section 402 received from the scanner section 402, to the CPU 411.

The operation section I/F 417 transmits an instruction from the user, which has been inputted from the operation section 403, to the CPU 411 and transmits screen information to be manipulated by the user, to the operation section 403.

The printer section 401 prints image data received from the printer I/F 415 on paper and transmits state information about the printer section 401 to the printer I/F 415.

The scanner section 402 converts image, which is formed on paper placed on the scanner section 402, to digital data in accordance with an image read instruction received from the scanner I/F 416 and transmits the digital data to the scanner I/F 416, and transmits a state of the scanner section 402 to the scanner I/F 416.

The operation section 403 makes it possible for a user to operate the information processing apparatus 101. The operation section 403 is provided, for example, with a liquid crystal screen having a touch panel to provide an operation screen to the user and accept an operation from the user.

The expansion unit I/F 418 is a unit which makes it possible to connect a unit for adding a function to the information processing apparatus 101. For example, in the case of stapling pieces of paper printed by the printer section 401, a unit for realizing it is connected through the expansion unit I/F 418. Then, the CPU 411 detects that the unit has been connected and gives an appropriate instruction to the unit.

Figure 2B:
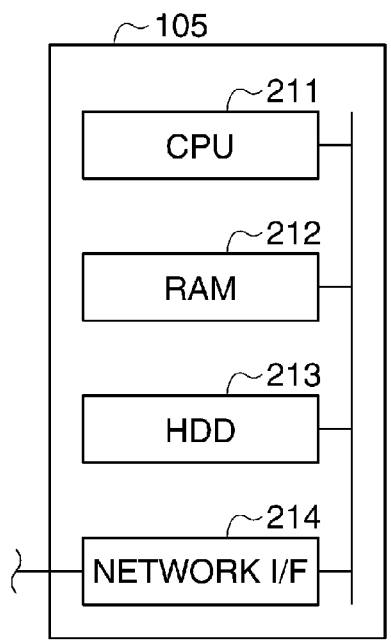
FIG. 2B is a block diagram showing a schematic configuration of hardware of the management server in FIG. 1.

FIG. 2B is a block diagram showing a schematic configuration of hardware of the management server 105 in FIG. 1.

The management server 105 is provided with a CPU 211, a RAM 212, an HDD 213 and a network I/F 214. The CPU 211 is in charge of controlling the whole apparatus and can control giving and reception of data to and from the RAM 212, the HDD 213 and the network I/F 214. The CPU 211 develops a control program (instructions) read out from the HDD 213 on the RAM 212 and executes the instructions stored in the RAM 212.

In the HDD 213, the control program (instructions) for realizing processes to be described later, which can be executed by the CPU 211, is stored. In addition, set values and the like used in the information processing apparatus 101 and the like can be stored in the HDD 213.

The RAM 212 can develop the instructions stored in the HDD 213 so as to be read out by the CPU 211, and can store various kinds of data required for execution of the instructions.

The network I/F 214 is an I/F for performing network communication with the apparatuses in the information processing system, which notifies the CPU 211 that data has been received and transmits data on the RAM 212 to the network.

Figure 3:
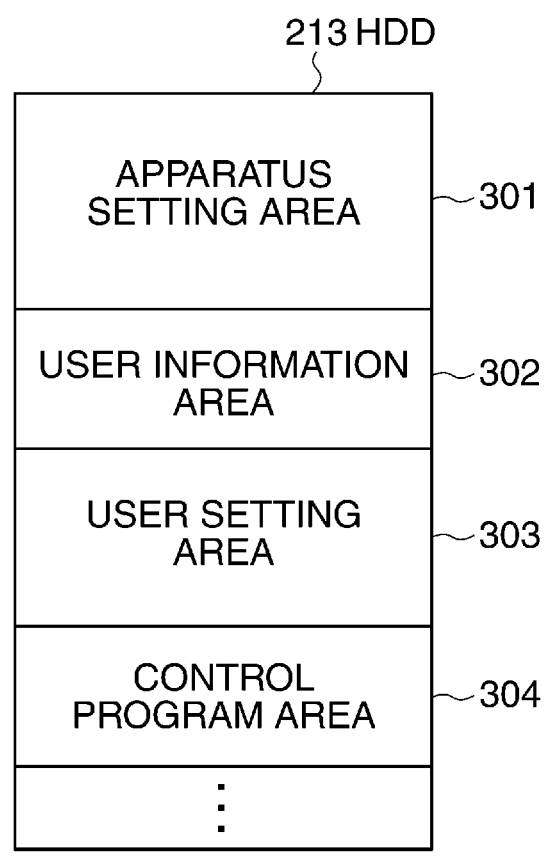
FIG. 3 is a schematic diagram of data storage areas in an HDD in the management server.

FIG. 3 is a schematic diagram of data storage areas in the HDD 213 in the management server 105.

In the HDD 213 in the management server 105, an apparatus setting area 301, a user information area 302, a user setting area 303 and a control program area 304 are set.

The apparatus setting area 301 is an area for storing set values of each information processing apparatus 101 existing in the information processing system. Details will be described later with reference to FIGS. 4A and 4B.

The user information area 302 is an area for storing user information about the user who uses each information processing apparatus 101 existing in the information processing system. Information for identifying each user, such as a user name, password and user ID of the user, is stored in this area.

The user setting area 303 is an area for storing set values corresponding to each user managed by the user information area 302. The stored set values are used when a user uses the information processing apparatus 101. Details will be described later with reference to FIG. 5.

The control program area 304 is an area for storing a control program executed by the CPU 211 of the management server 105.

FIG. 4A is a schematic diagram of data storage areas in the apparatus setting area 301 in FIG. 3, and FIG. 4B is a schematic diagram of data storage areas in a system's shared setting information area 311 and an apparatus-specific setting information area 322 in FIG. 4A.

The apparatus setting area 301 is configured with a system's shared setting area 310 and one or more apparatus-specific setting areas 320.

The system's shared setting area 310 is configured with the plurality of system's shared setting information areas 311 and stores set values shared among all the information processing apparatuses 101 within the information processing system (also referred to as "system's shared setting information").

The apparatus-specific setting area 320 is a data area for managing a set value which differs among the information processing apparatuses 101 within the information processing system (also referred to as "apparatus-specific setting information") for each apparatus. The apparatus-specific setting area 320 is configured with an apparatus name area 321 and one or more apparatus-specific setting information areas 322.

In the apparatus name area 321, information used for identifying any of the plurality of information processing apparatuses 101 in the information processing system is stored. For example, it is conceivable to cause an information processing apparatus 101 and an UUID (Universally Unique Identifier) to correspond to each other one to one.

In FIG. 4B, each of the system's shared setting information areas 311 and the apparatus-specific setting information areas 322 is configured with a setting ID area 315, a setting name area 316, a set value area 317 and a user-permitted-to-change area 318.

In the setting ID area 315, information used for identifying a certain particular setting is stored. For example, it is conceivable to cause a setting and an UUID (Universally Unique Identifier) to correspond to each other one to one.

In the setting name area 316, a title of a set value enabling a user to recognize the content of the set value is stored. In the set value area 317, the set value itself is stored. In the user-permitted-to-change area 318, user IDs representing users who can change the set value are enumerated and stored. Here, a particular ID having a special meaning may be stored in data included in the user-permitted-to-change area 318. For example, a particular ID representing that any user of the information processing apparatus 101 can change the set value or that any user having administrator rights can change the set value is possible.

By managing apparatus setting information as described above, it becomes possible for the management server 105 to perform integrated management of set values to be shared by all the information processing apparatuses 101 within the information processing system and set values which differ according to the information processing apparatuses 101. It should be noted that whether each set value is to be stored into the system's shared setting area 310 or into the apparatus-specific setting area 320 may be fixedly determined by the control program or may be selected by the user of the information processing system in some way, for example, via a Web browser.

Figure 5:
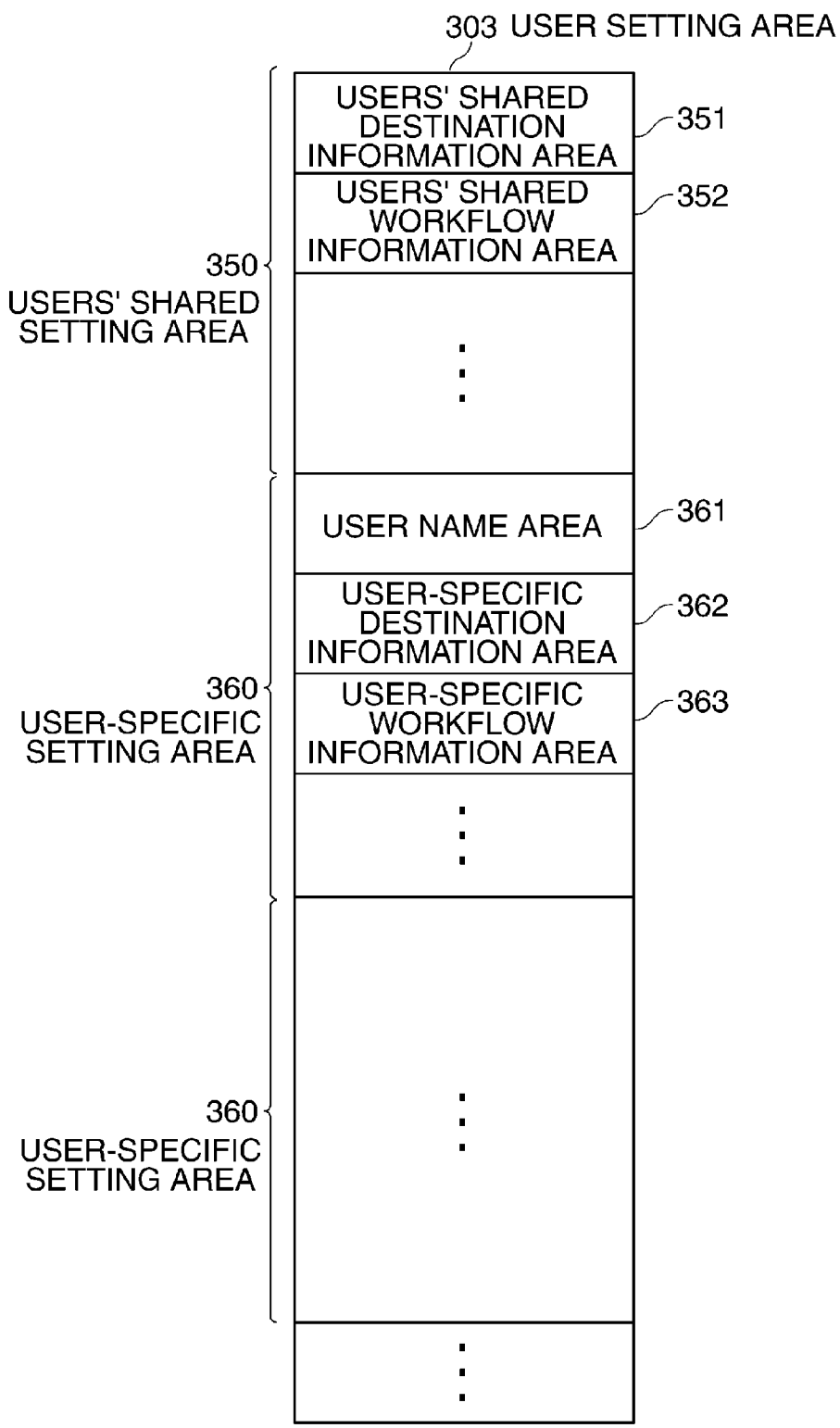
FIG. 5 is a schematic diagram of data storage areas in a user setting area in FIG. 3.

FIG. 5 is a schematic diagram of data storage areas in the user setting area 303 in FIG. 3.

The user setting area 303 is configured with a users' shared setting area 350 and one or more user-specific setting areas 360. The users' shared setting area 350 is a data area for storing a set value shared by all users using the information processing system (also referred to as "users' shared setting information"), and it is configured with a users' shared destination information area 351 and a plurality of users' shared workflow information area 352.

The users' shared destination information area 351 is an area for storing information about destinations shared by all the users using the information processing system among destinations used at the time of transmitting data of an image read by the scanner section 402 of the information processing apparatus 101 to another apparatus.

The users' shared workflow information area 352 is an area for storing workflow information making it possible to preset in advance combination of settings of the scanner section 402, the printer section 401 and the like provided for the information processing apparatus 101 to use it by an easy operation.

In the present embodiment, the destination information and workflow information to be shared are stored in the users' shared setting area 350. However, if there is another set value to be shared by all the users, it may be stored in the area 350.

The user-specific setting area 360 is a data area for storing different settings for each user using the information processing system, and it is configured with a user name area 361, a user-specific destination information area 362 and a user-specific workflow information area 363.

In the user name area 361, information for identifying a user who uses the information processing system, such as a user ID corresponding to any one of the users stored in the user information area 302, is stored.

The user-specific destination information area 362 is an area for storing information about destinations managed for each user using the information processing system among destinations used at the time of transmitting data of an image read by the scanner section 402 of the information processing apparatus 101 to another apparatus.

The user-specific workflow information area 363 is an area for storing workflow information making it possible to preset in advance combination of settings of the scanner section 402, the printer section 401 and the like provided for the information processing apparatus 101 to use it by an easy operation.

In the present embodiment, the destination information and workflow information to be managed for each user individually are stored in the user-specific setting area 360. However, if there is another set value to be managed for each user individually, it may be stored in the area 360.

By managing user settings as described above, it becomes possible for the management server 105 to perform integrated management of set values to be shared by all the users within the information processing system and set values to be managed for each user.

Figure 6:
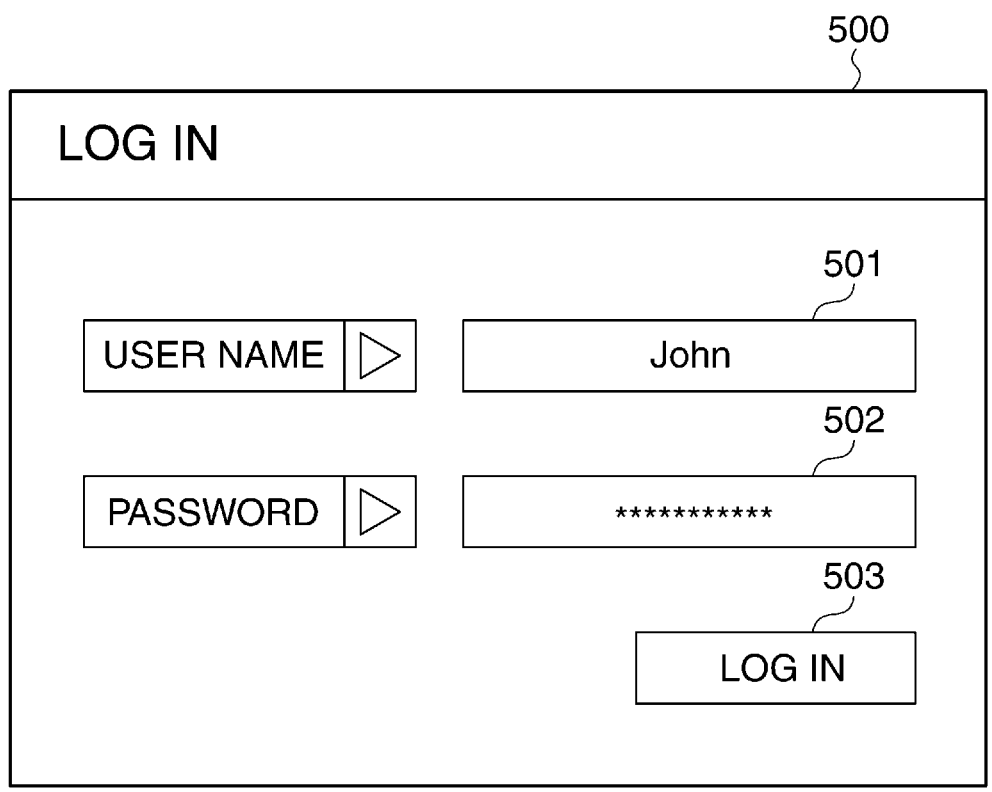
FIG. 6 is a diagram showing an example of a login screen displayed on an operation section of the information processing apparatus.

FIG. 6 is a diagram showing an example of a login screen displayed on the operation section 403 of the information processing apparatus 101.

When input of a user name and a password is accepted from a user on a login screen 500, the content of the input is displayed in a user name display area 501 and a password display area 502. After that, when detecting that a login start button 503 has been pressed down, the CPU 411 in the information processing apparatus 101 performs a user authentication process with the management server 105. In the user authentication process, the user is permitted to use the information processing apparatus 101, for example, only when a corresponding user name exists in the user information area 302 in the management server 105.

Figure 7A:
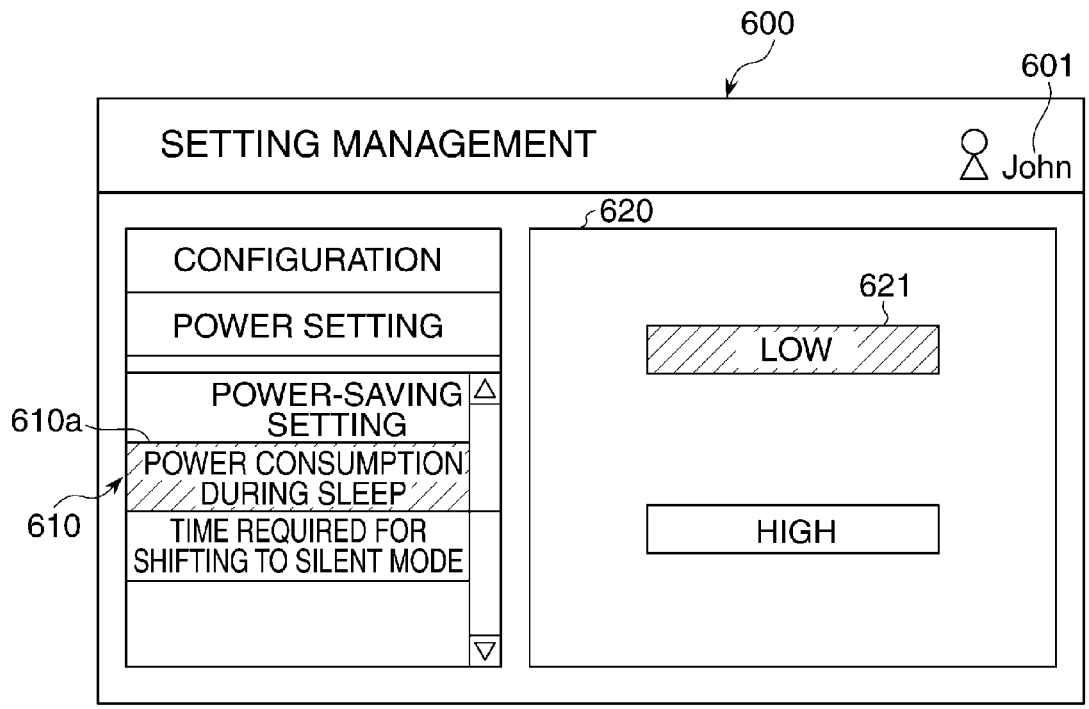
FIG. 7A is a diagram showing an example of an apparatus setting screen displayed on the operation section of the information processing apparatus.

FIG. 7A is a diagram showing an example of an apparatus setting screen displayed on the operation section 403 of the information processing apparatus 101.

An apparatus setting screen 600 is one of screens displayed after a user logs in the information processing apparatus 101 on the login screen 500 shown in FIG. 6, and it is a setting screen for setting or changing the apparatus settings of the information processing apparatus 101.

On the apparatus setting screen 600, there is a user information display area 601 for identifying a user who currently logs in (a login user), where information about the login user is displayed. The information displayed on this screen is configured on the basis of system's shared setting information which the information processing apparatus 101 has acquired from the system's shared setting area 310 of the management server 105 and apparatus-specific setting information in the apparatus-specific setting area 320 corresponding to the information processing apparatus 101 which displays this screen. Though it is assumed in the present embodiment that the CPU 411 of the information processing apparatus 101 acquires the system's shared setting information from the system's shared setting area 310 of the management server 105 and acquires the apparatus-specific setting information from the apparatus-specific setting area 320, the present invention is not limited thereto.

On the apparatus setting screen 600, only setting names of settings which can be changed by a login user are displayed in a setting name list area 610. The settings which can be changed by a login user are determined by referring to the system's shared setting information which the information processing apparatus 101 has acquired from the system's shared setting information areas 311 of the management server 105 and the user names stored in the user-permitted-to-change areas 318 in the apparatus-specific setting information areas 322. When the login user selects one from among the setting names displayed in the setting name list area 610, a screen for changing a set value corresponding to the selected setting name is displayed in a setting changing area 620.

In the setting name list area 610 in FIG. 7A, a setting name 610a described above selected by the login user is a setting name "power consumption during sleep". In a setting changing area 620, "low" and "high" are displayed with regard to "power consumption during sleep", indicating that the login user can select one of them. In the shown example, "low" is selected.

When the login user changes the set value in the setting changing area 620, the information processing apparatus 101 detects it. When the set value has been changed, the content of the change is transmitted from the information processing apparatus 101 to the management server 105.

Though only apparatus settings that can be changed by a user who has logged in the information processing apparatus 101 are displayed in the present embodiment, other display methods are also possible. For example, control may be performed so that, for example, a user who is not permitted to make a change can view set values. Though description has been made on the case where "power setting" of "configuration" is displayed in the setting name list area 610 in the shown example, any setting that can be changed by the information processing apparatus 101 is possible without being limited thereto.

Figure 7B:
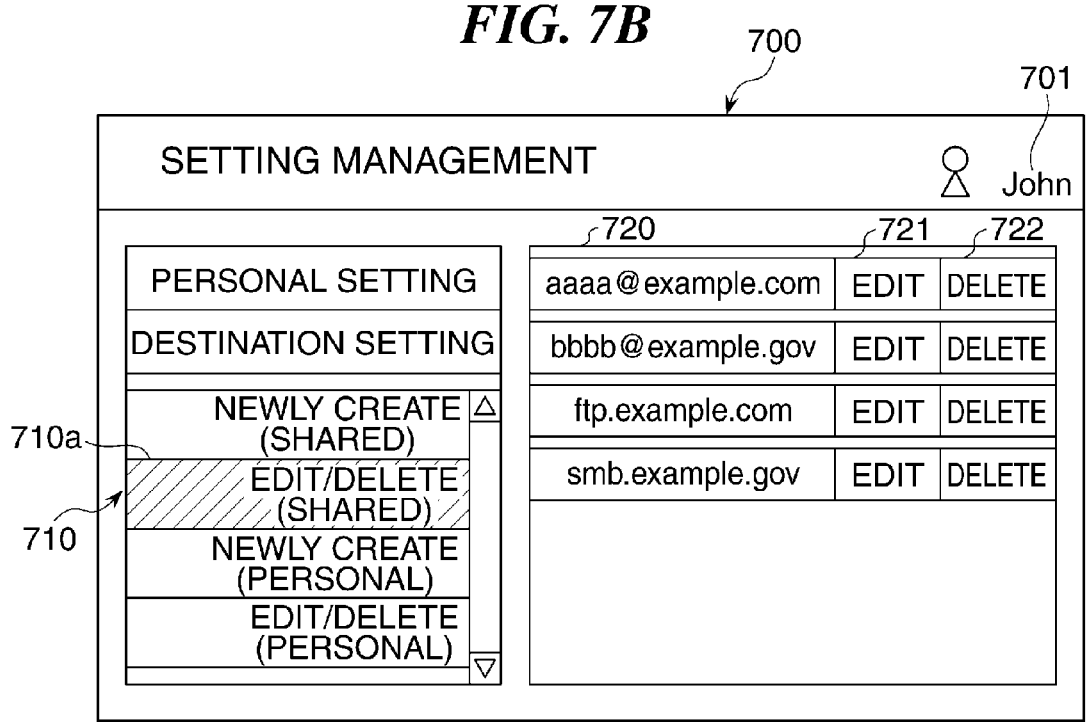
FIG. 7B is a diagram showing an example of a user setting screen displayed on the operation section of the information processing apparatus.

FIG. 7B is a diagram showing an example of a user setting screen displayed on the operation section 403 of the information processing apparatus 101.

A user setting screen 700 is one of screens displayed after the user logs in the information processing apparatus 101 on the login screen 500 shown in FIG. 6, and it is a setting screen for changing the user settings of the information processing apparatus 101.

On the user setting screen 700, there is a user information display area 701 for identifying a login user, where information about the login user is displayed. The information displayed on this screen is configured on the basis of users' shared setting information acquired from the users' shared setting area 350 of the management server 105 and user-specific setting information in the user-specific setting area 360 corresponding to the login user. Though it is assumed in the present embodiment that the CPU 411 of the information processing apparatus 101 acquires users' shared setting information from the users' shared setting area 350 of the management server 105 and acquires user-specific setting information from the user-specific setting area 360, the present invention is not limited thereto.

In the user setting screen 700, a personal setting which can be changed by the login user currently, contents of changes which can be made for the personal setting (menu items) are displayed in an operation menu area 710. When the login user selects a particular menu item, a screen for making a change corresponding to the selected menu item is displayed in a setting operation area 720.

On the user setting screen 700 shown in FIG. 7B, the menu item the login user has selected in the operation menu area 710 is an "editing/deletion (shared)" menu item for performing change (editing)/deletion of users' shared destination information. In response to the selection, the information processing apparatus 101 displays a screen for changing or deleting destination information stored in the users' shared destination information area 351, in the setting operation area 720.

In the setting operation area 720 in FIG. 7B, a plurality of mail addresses are displayed as the destination information. An edit button 721 and a delete button 722 are arranged for display of each mail address. When any of the buttons is pressed down, the login user can change or delete a set value (here, a mail address). When a change is made or deletion is performed, the information processing apparatus 101 detects it, and the content of the change or deletion is transmitted to the management server 105.

Next, description will be made on a process for communication to the management server 105 performed by the information processing apparatus 101 when a set value is changed on the screens shown in FIGS. 7A and 7B.

Figure 8:
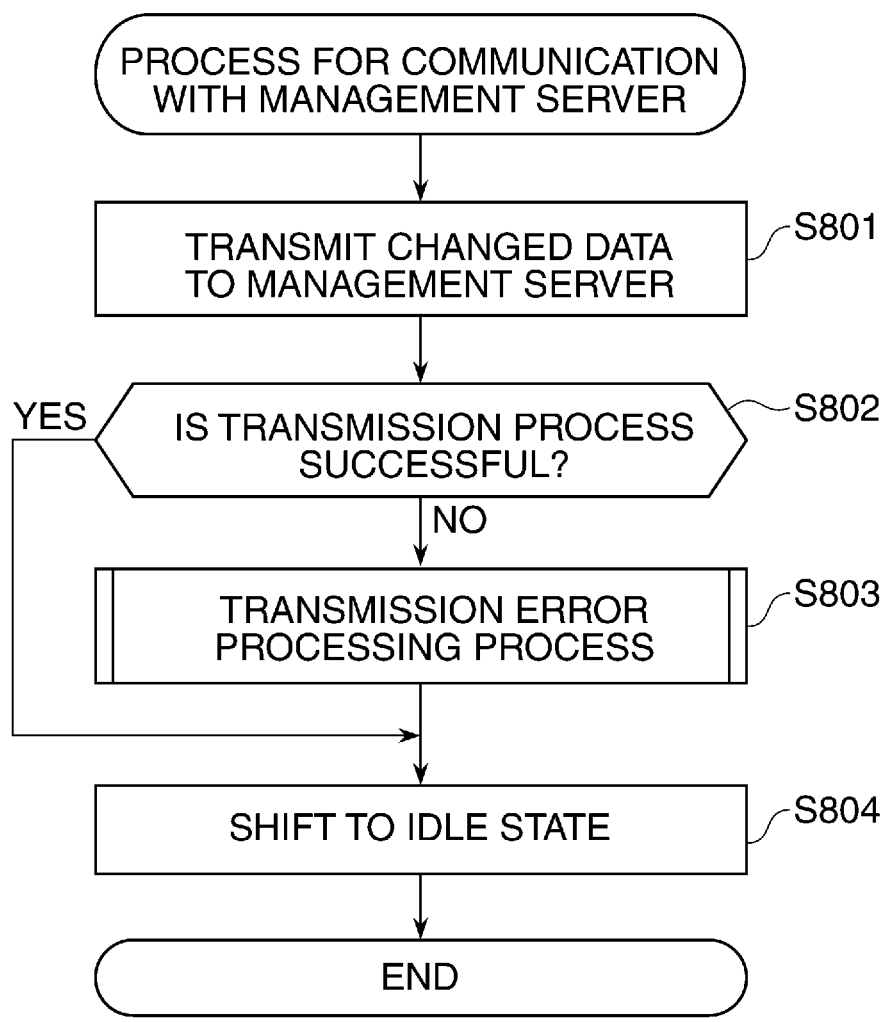
FIG. 8 is a flowchart showing a flow of a process for communication to the management server, in the information processing apparatus.

FIG. 8 is a flowchart showing a flow of a process for communication to the management server 105 in the information processing apparatus 101. The shown process shows a process executed by the CPU 411 of the information processing apparatus 101 by appropriately reading out data from the RAM 412, the HDD 413 or the like. It should be noted that this process is not necessarily performed in synchronization of a user operation in FIGS. 7A and 7B, but may be performed at a timing different from a user operation as a background process.

In FIG. 8, first, the CPU 411 transmits changed data to the management server 105 in accordance with a protocol and a data format predetermined in advance (step S801). For example, it is conceivable to transmit the data using HTTP (Hypertext Transfer Protocol) and XML (Extensible Markup Language) as the protocol and the data format, respectively. In this case, the information processing apparatus 101 also transmits information for identifying the user who made the change and the apparatus itself (the information processing apparatus 101) together with the content of the change in a set value if necessary.

Next, the CPU 411 judges whether the transmission process of step S801 is successful or not (step S802). If the transmission process is successful (step S802: YES), the CPU 411 ends the communication with the management server 105. On the other hand, if the transmission process has failed in step S802 (step S802: NO), the CPU 411 proceeds to step S803, executes a transmission error processing process and ends the present process.

Figure 9:
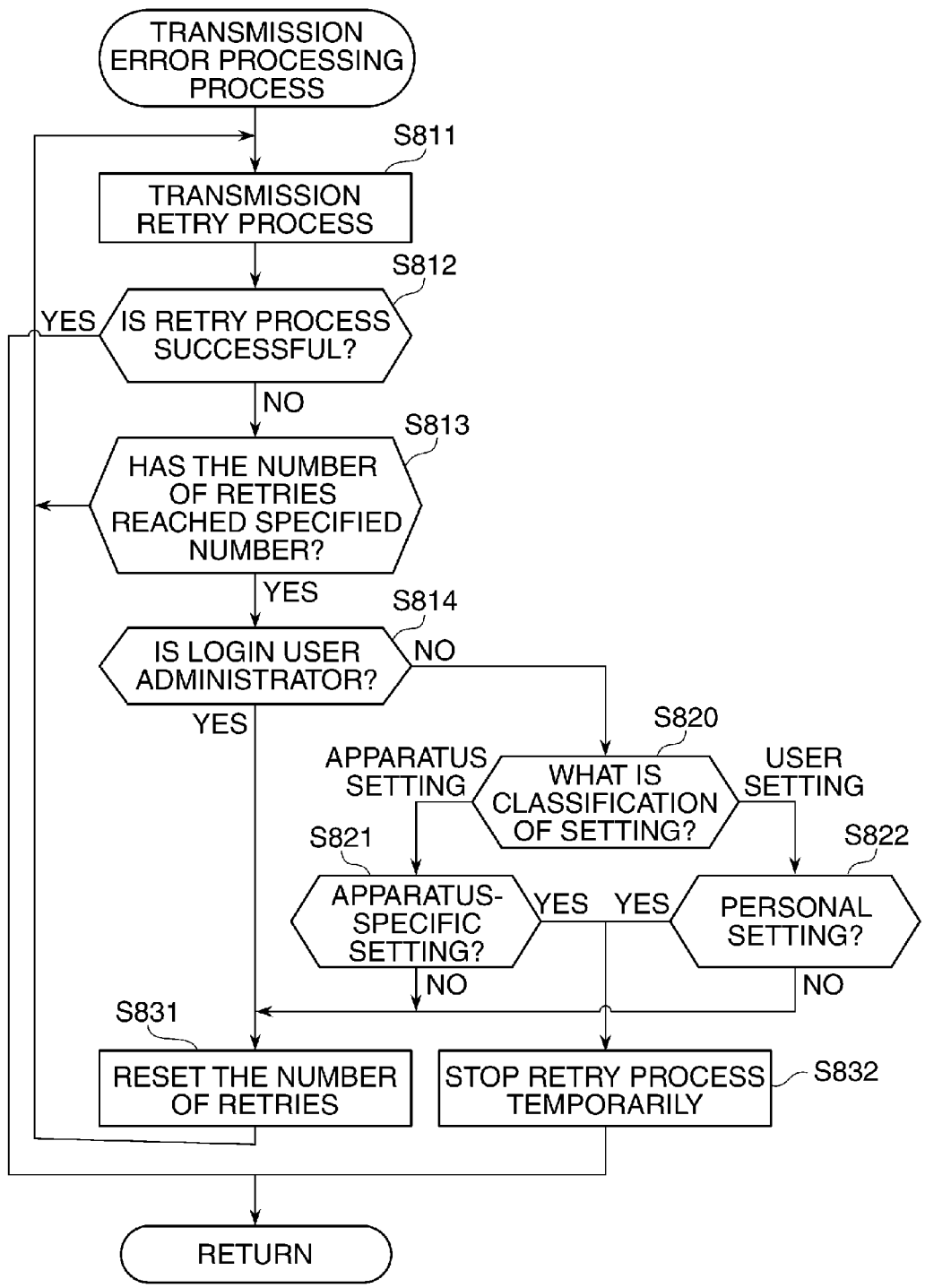
FIG. 9 is a flowchart showing details of a transmission error processing process of step S803 in FIG. 8.

FIG. 9 is a flowchart showing details of the transmission error processing process in step S803 in FIG. 8.

In step S811, the CPU 411 performs a process for transmitting the same data as transmitted in step S801 in FIG. 8, to the management server 105 (a retry process) after waiting for a predetermined time.

Next, the CPU 411 judges whether the retry process of step S811 is successful or not (step S812). If the retry process is successful (step S812: YES), the CPU 411 ends the present process, which is a transmission error processing process, and returns. On the other hand, if the transmission retry process has failed in S812, the CPU 411 confirms whether the number of retries counted in advance has reached a specified number of retries (step S813). If the number has not reached the specified number of retries (step S813: NO), the CPU 411 performs the process of S811 again. The specified number of retries may be a fixed number of times specific to the information processing apparatus 101. Alternatively, the specified number of retries may be changed by the user as an apparatus setting.

If it is judged in step S813 that the number of retries has reached the specified number of retries (step S813: YES), the CPU 411 judges whether or not the login user who has changed the data to be transmitted to the management server 105 is a user having administrator rights (step S814).

If the login user who has changed the data is a user having administrator rights as a result of the judgment in step S814, the CPU 411 resets the number of retries being counted (step S831) and returns to the process of step S811 to repeat the retry process.

If the login user who has changed the data is a user having administrator rights as described above, the content of the change in the data is thought to be important. Therefore, the information processing apparatus 101 continues a process for reflecting the data on the management server 105.

If the login user who has changed the data is not a user having administrator rights as a result of the judgment of step S814, the CPU 411 judges the classification of data to be transmitted by the retry process next (step S820). That is, the CPU 411 judges whether the data to be transmitted is managed in the apparatus setting area 301 or in the user setting area 303 in the management server 105.

If it is judged in step S820 that the classification is "apparatus setting", the CPU 411 proceeds to step S821. In step S821, the CPU 411 then judges whether the data to be transmitted by the retry process is stored in the system's shared setting area 310 or in the apparatus-specific setting area 320 in the management server 105.

If it is judged in step S821 that the data to be transmitted is stored in the system's shared setting area 310 (step S821: NO), the CPU 411 resets the number of retries being counted (step S831) and returns to the process of step S811 to repeat the retry process.

On the other hand, if it is judged in step S821 that the data to be transmitted is stored in the apparatus-specific setting area 320 (step S821: YES), the CPU 411 stops the retry process temporarily after writing the data to be retried into a predetermined area of the HDD 413 (step S832). Then, the CPU 411 ends the transmission error processing process and returns. If having ended the transmission error processing process, the CPU 411 causes the information processing apparatus 101 to shift to an idle state of not having an instruction to be executed. Thereby, the information processing apparatus 101 can shift to a sleep state when satisfying a predetermined condition.

Thus, in the case of a set value which is not shared with the other information processing apparatuses 101, even if the content is not reflected on the management server 105 immediately, it has little influence on the whole information processing system. Therefore, it is possible to, by stopping the retry process temporarily, cause the information processing apparatus 101 to be in a state of being able to shift to the sleep state.

If it is judged in step S820 that the classification is "user setting", the CPU 411 proceeds to step S822. In step S822, the CPU 411 then judges whether the data to be transmitted by the retry process is stored in the users' shared setting area 350 or in the user-specific setting area 360 in the management server 105.

If it is judged in step S822 that the data to be transmitted is stored in the users' shared setting area 350 (step S822: NO), the CPU 411 resets the number of retries being counted (step S831) and returns to the process of step S811 to repeat the retry process. On the other hand, if it is judged in step S822 that the data to be transmitted is stored in the user-specific setting area 360 (step S822: YES), the CPU 411 stops the retry process temporarily after writing the data to be retried into a predetermined area of the HDD 413 (step S832). Then, the CPU 411 ends the transmission error processing process and returns.

If having ended the above transmission error processing process and returns, the CPU 411 causes the information processing apparatus 101 to shift to an idle state of not having an instruction to be executed (step S804 in FIG. 8). Thereby, the information processing apparatus 101 can shift to a sleep state when satisfying a predetermined condition.

Thus, in the case of a set value which is not shared with the other users, even if the content is not reflected on the management server 105 immediately, it has little influence on the whole information processing system. Therefore, it is possible to, stopping the retry process temporarily, cause the information processing apparatus 101 to be in a state of being able to shift to the sleep state.

According to the first embodiment described above, when a process for retrying transmission of changed data to the management server 105 is performed in the information processing apparatus 101 in the information processing system, it is possible to suppress unnecessary power consumption of the information processing apparatus 101 by controlling the retry process in consideration of the classification of the data.

Second Embodiment

In the first embodiment described above, it has been described that, when performing a process for retrying transmission data to the management server 105, the information processing apparatus 101 controls the process in consideration of the classification of the data, and, therefore, power consumption of the information processing apparatus 101 can be suppressed. Furthermore, in the first embodiment, it has been shown that, when having stopped the retry process temporarily in step S832, the CPU 411 causes the information processing apparatus 101 to be in a state of being able to shift to a sleep state by causing the information processing apparatus 101 to shift to an idle state. In the present embodiment, description will be made on a process for resuming the retry process which has been stopped temporarily when the information processing apparatus 101 returns from the sleep state. It should be noted that, as for parts similar to those of the above first embodiment, the same reference numerals will be used, and description of the parts will be omitted. Only points different from the first embodiment will be described below.

Figure 10:
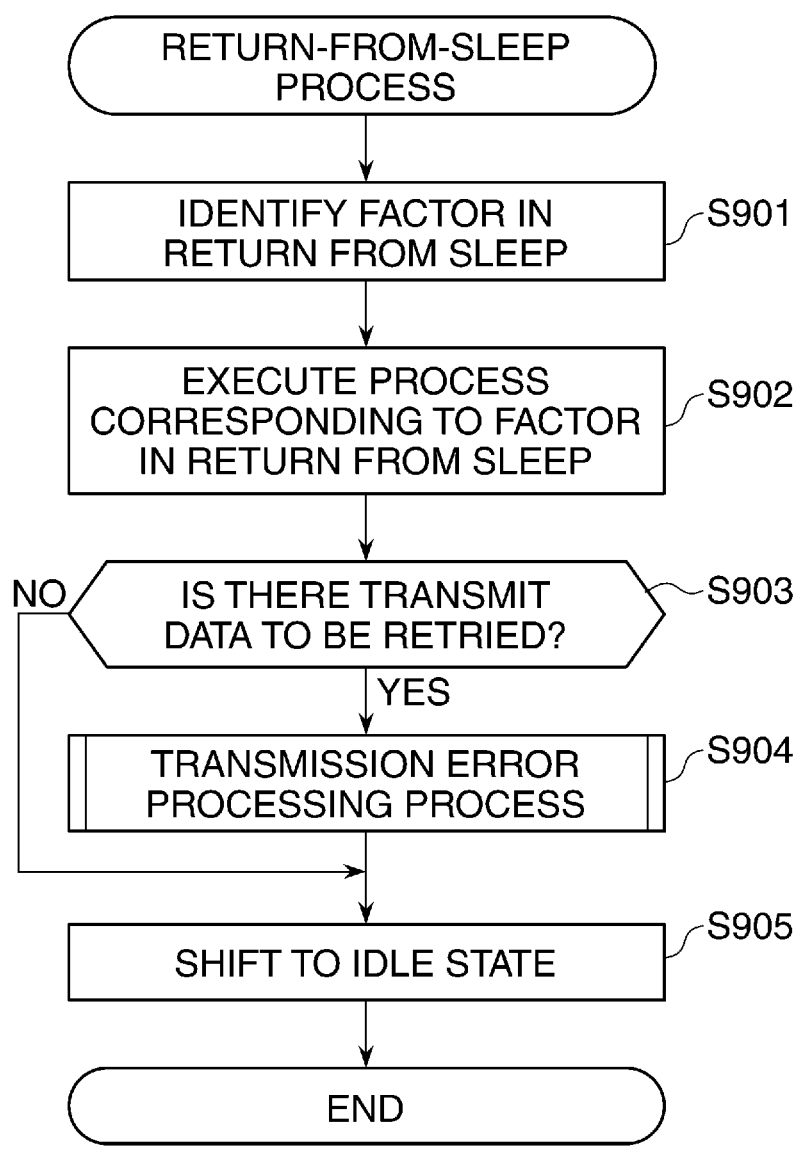
FIG. 10 is a flowchart showing a flow of a return-from-sleep process of the information processing apparatus in a second embodiment of the present invention.

FIG. 10 is a flowchart showing a flow of a return-from-sleep process of the information processing apparatus 101 in the second embodiment of the present invention. The shown process shows a process executed by the CPU 411 of the information processing apparatus 101 by appropriately reading out data from the RAM 412, the HDD 413 or the like.

When returning from sleep, the CPU 411 first identifies what was the factor in having returned from sleep (step S901). As examples of the factor, it is conceivable that a request for printing a document has been received from an external apparatus such as an information processing terminal 103, that it is detected that the user has operated the operation section 403, and the like. The factor, however, is not limited thereto.

Next, the CPU 411 performs a process corresponding to the factor in having returned from sleep which has been identified in step S901 (step S902). For example, if having received a request for printing a document, the CPU 411 controls the information processing apparatus 101 to receive document data corresponding to the printing request and print the document data.

Then, the CPU 411 judges whether or not there is transmit data to be transmitted by resuming the retry process (hereinafter referred to as transmit data to be retried) in a predetermined area of the HDD 413 (step S903). If there is not transmit data to be retried in the predetermined area as a result of the judgment of step S903, the CPU 411 causes the information processing apparatus 101 to shift to an idle state (step S905). On the other hand, if there is transmit data to be retried in the predetermined area as a result of the judgment of step S903, the CPU 411 causes the information processing apparatus 101 to shift to the idle state (step S905) after performing the transmission error processing process shown in FIG. 9 (step S904).

According to the second embodiment described above, it is possible to certainly resume the retry process which has been stopped temporarily by performing the return-from-sleep process described above.

Third Embodiment

In the first and second embodiments described above, description has been made on a method for performing the process of retrying transmission of data to the management server 105 in the information processing apparatus 101, and it has been described that power consumption of the apparatus can be suppressed as appropriate.

In general, however, when having shifted to a sleep state, an information processing apparatus does not return from the sleep (power-saving) state without a trigger as an external factor for returning from sleep, such as a print job being thrown in from the information processing terminal 103. Therefore, when the retry process is stopped temporarily, the timing of resuming the retry process depends on the outside of the apparatus. This may cause a problem, depending on the content of changed data.

Thus, in the present embodiment, a method for appropriately setting the timing of resuming the retry process will be described. It should be noted that, as for parts similar to those of the above first embodiment, the same reference numerals will be used, and description of the parts will be omitted. Only points different from the first embodiment will be described below.

Though processes for communication with the management server 105 in the information processing apparatus 101 in the present embodiment is similar to the processes shown in FIGS. 8 and 9 described in the first embodiment, the processes executed after the process of step S832 in FIGS. 8 and 9 differs from each other.

When the retry process stops temporarily in step S832 in FIG. 9, the CPU 411 sets a timing of the information processing apparatus 101 automatically returning from a sleep state starting on the time point of shifting to the sleep state and, after that, ends the transmission error processing process and returns. The timing set then may be an hour, for example, one o'clock in the afternoon of the next day or may be specified, for example, as six hours after the time point. Management of the timing to automatically return from the sleep state is performed, for example, by registering a timer with an RTC (real-time clock), which is a peripheral circuit of the CPU 411, or the like. Other methods are also possible if they are executable.

It should be noted that such a configuration is also possible that the CPU 411 automatically switches the timing of automatically returning from the sleep state, which is set in the present embodiment, according to factors in failure in the transmission process in step S802 in FIG. 8. For example, if the failure factor described above is that communication was impossible because of temporary overload of the management server 105, it is assumed that communication will be possible in a relatively short time, and, therefore, it is preferable to set the timing of the information processing apparatus 101 returning from the sleep state relatively early. On the other hand, if the failure factor is that a communication channel with the management server 105 itself was not established, it is conceivable that much time will be required for recovery, and, therefore, it is preferable to set the timing of the information processing apparatus 101 returning from the sleep state relatively late.

When returning from the transmission error processing process after setting the timing of automatic return, the CPU 411 causes the information processing apparatus 101 to shift to an idle state (step S804). After that, the information processing apparatus 101 shifts to a sleep state when satisfying a predetermined condition, but it automatically returns from the sleep state at the set timing. After that, the CPU 411 performs a process in and after step S903 in FIG. 10.

According to the third embodiment, by automatically setting the timing of returning from sleep after stopping the retry process temporarily, the information processing apparatus 101 can perform an appropriate retry resuming process according to a situation.

The case of applying the present invention to an information processing apparatus has been described in the first to third embodiments described above. The present invention, however, is not limited thereto, and it goes without saying that the present invention may be applied to an image forming apparatus, such as a printer, and an image processing apparatus, such as a complex machine.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-238769, filed Nov. 19, 2013, which is hereby incorporated by reference herein in its entirety.

What is claimed is:

1. An information processing apparatus configured to connect to a management server managing a set value used among a plurality of information processing apparatuses, the information processing apparatus comprising:
a processor connected to a storage device, the processor configured to:
acquire a set value from the management server;
change the acquired set value;
transmit information indicating a content of the change in the set value to the management server; and
retry transmission of the information when the transmission of the information fails,
wherein the processor is configured to determine, according to a classification of the set value corresponding to the information, whether to temporarily restrict performing retrying of the transmission of the information or to perform retrying of the transmission of the information.

2. The information processing apparatus according to claim 1, wherein, if the classification of the set value of the information is a set value not shared with the other information processing apparatuses, the processor is configured to determine to restrict temporarily performing retrying the transmission of the information and cause the information processing apparatus to shift to a power-saving state.

3. The information processing apparatus according to claim 2, wherein the set value not shared with the other information processing apparatuses is a user-specific set value.

4. The information processing apparatus according to claim 2, wherein the set value not shared with the other information processing apparatuses is an apparatus-specific set value.

5. The information processing apparatus according to claim 2,
wherein, if there is information to be transmitted when the information processing apparatus returns from the power-saving state, the processor is configured to resume retrying transmission of the information that has been restricted temporarily.

6. The information processing apparatus according to claim 2, wherein, in response to a restriction of performing of the retrying of the transmission of the information, the processor is configured to set a timing for the information processing apparatus to return from the power-saving state.

7. The information processing apparatus according to claim 6, wherein the processor is configured to set the timing for the information processing apparatus to return from the power-saving state according to one or more factors associated with the failure of the transmission of the information.

8. A control method for an information processing apparatus configured to connect to a management server managing a set value used among a plurality of information processing apparatuses, the method comprising:
an acquisition step of acquiring a set value from the management server;
a changing step of changing the acquired set value;
a transmission step of transmitting information indicating a content of the change in the set value to the management server; and
a retry step of retrying transmission of the information when the transmission of the information by the transmission step fails,
wherein the method determines, according to a classification of the set value corresponding to the information, whether to temporarily restrict execution of the retry step or to execute the retry step.

9. A non-transitory computer-readable storage medium having stored therein a program for causing a computer to implement a method of controlling an information processing apparatus, the method comprising:
an acquisition step of acquiring a set value from a management server;
a changing step of changing the acquired set value;
a transmission step of transmitting information indicating a content of the change in the set value to the management server; and
a retry step of retrying transmission of the information when the transmission of the information by the transmission step fails,
wherein the method determines, according to a classification of the set value corresponding to the information, whether to temporarily restrict execution of the retry step or to execute the retry step.

* * * * *